(12) United States Patent
Leon

(10) Patent No.: US 11,808,403 B2
(45) Date of Patent: Nov. 7, 2023

(54) MAGNETIC FUNNEL HOLDER

(71) Applicant: Lisle Corporation, Clarinda, IA (US)

(72) Inventor: Victor Leon, Lomita, CA (US)

(73) Assignee: Lisle Corporation, Clarinda, IA (US)

( * ) Notice: Subject to any disclaimer, the term of this patent is extended or adjusted under 35 U.S.C. 154(b) by 177 days.

(21) Appl. No.: 17/361,527

(22) Filed: Jun. 29, 2021

(65) Prior Publication Data

US 2022/0154877 A1 May 19, 2022

Related U.S. Application Data

(63) Continuation of application No. 29/758,849, filed on Nov. 18, 2020.

(51) Int. Cl.
*B65B 39/00* (2006.01)
*F16M 13/02* (2006.01)
*B67C 11/02* (2006.01)

(52) U.S. Cl.
CPC ........... *F16M 13/022* (2013.01); *B67C 11/02* (2013.01)

(58) Field of Classification Search
CPC ........ F16M 13/022; B67C 11/02; B67C 11/00
See application file for complete search history.

(56) References Cited

U.S. PATENT DOCUMENTS

| | | | | |
|---|---|---|---|---|
| 1,904,510 A | * | 4/1933 | Mott | B60R 7/12 211/63 |
| 7,040,590 B2 | * | 5/2006 | Carnevali | B60N 3/103 248/311.2 |
| 7,601,001 B1 | * | 10/2009 | McCrary | A61C 17/06 206/363 |
| 7,967,274 B1 | * | 6/2011 | Stallings, Jr. | A45B 11/00 248/537 |
| 8,430,138 B2 | * | 4/2013 | McGeary | B67C 11/00 141/331 |
| 9,980,439 B2 | * | 5/2018 | Aller | B65D 25/22 |
| 11,020,296 B2 | * | 6/2021 | Burton | A61G 7/0503 |
| 11,382,443 B2 | * | 7/2022 | Priefert | F16B 9/05 |
| 2005/0218285 A1 | * | 10/2005 | Yorns | B25H 3/006 248/314 |
| 2020/0138217 A1 | * | 5/2020 | Adjeleian | F16B 1/00 |

* cited by examiner

*Primary Examiner* — Amy J. Sterling
(74) *Attorney, Agent, or Firm* — Banner & Witcoff, Ltd.

(57) ABSTRACT

A magnetic holder for a funnel or other tool has a tapered, cylindrical shaft. One or more arms extend from the shaft, with a magnets secured to the ends of the arms. The shaft has a wider opening on one end, and a narrower opening on the other end. The funnel or tool may be inserted into the wider opening, while the narrower opening may optionally be capped. The shaft may have interior ribs. The holder, except for the magnets, may be formed of a molded polymer. In use, the magnetic holder may be magnetically attached to a planar surface.

17 Claims, 6 Drawing Sheets

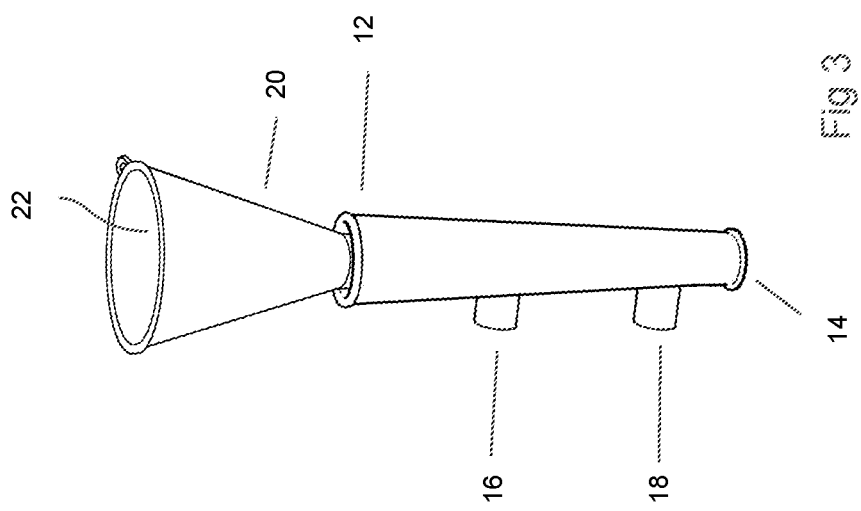

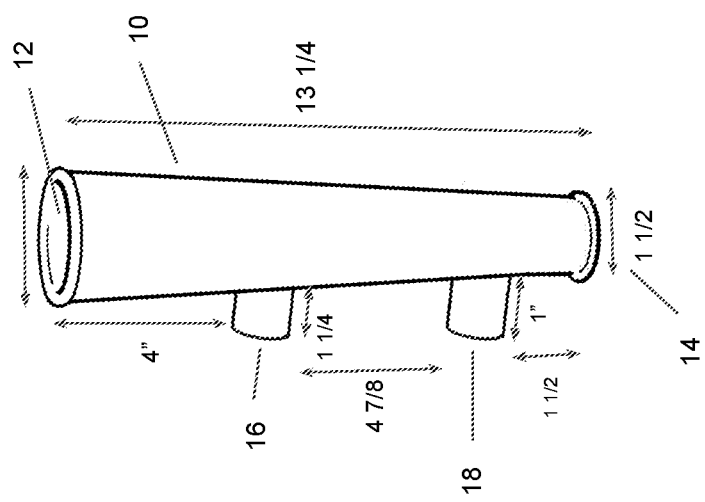

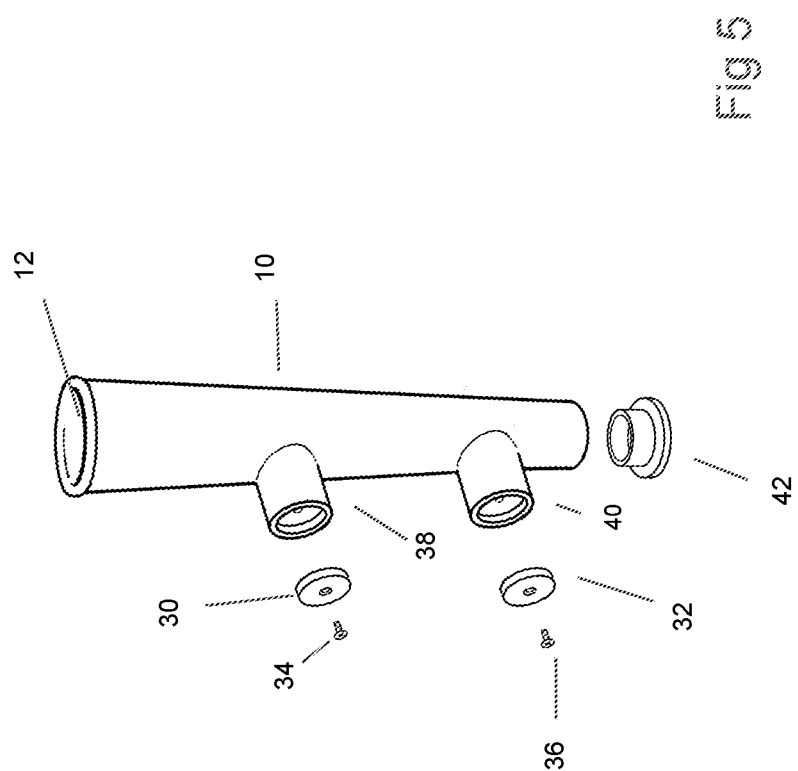

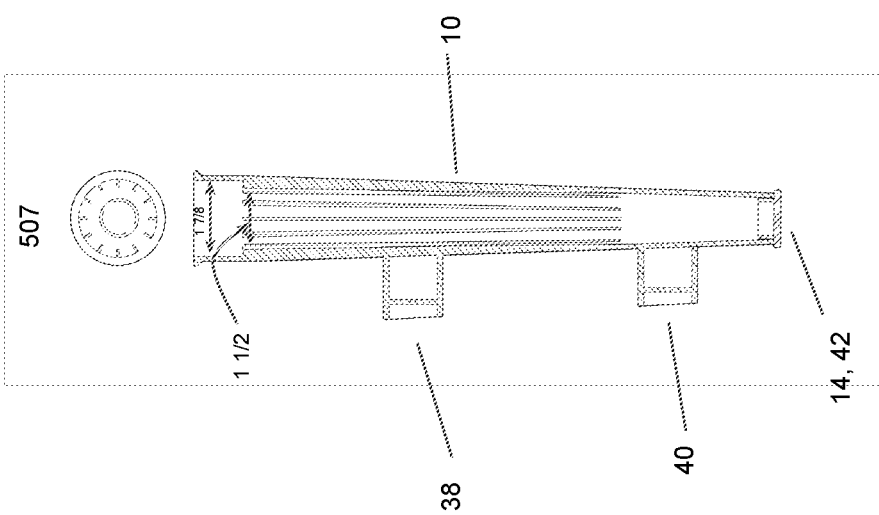

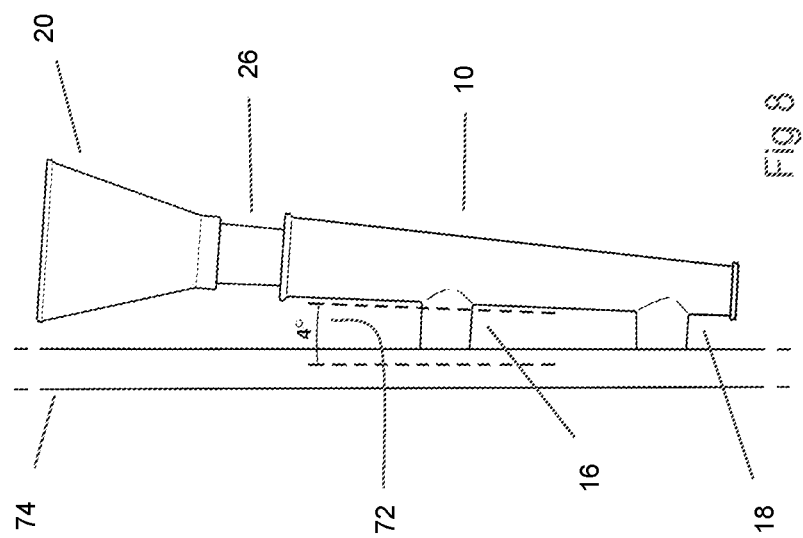

MAGNETIC FUNNEL HOLDER

RELATED APPLICATIONS

This application is a continuation-in-part of U.S. Design patent application Ser. No. 29/758,849, filed Nov. 18, 2020 and entitled, "Magnetic Funnel Holder," which is incorporated by reference herein in its entirety.

FIELD OF THE INVENTION

The present disclosure concerns embodiments of a holder that can hold a funnel or other object.

BACKGROUND

Funnels are used in automotive repairs, by plumbers, at car wash shops, machine shops, sheet metal shops, and woodworking shops, among others. In an automotive repair shop, funnels are used to for pouring oil or other fluids into an engine, for example. But many times, there is not a convenient place to store the funnel before and after use.

When a funnel is used to pour oil into an engine, for example, residual oil usually remains on the funnel. Placing the funnel on a surface of a table, for example, can cover the table with oil. Many other containers are the wrong size to accommodate the funnel, and the funnel may fall out and/or the container fall over. Other times, the user might simply throw the funnel away. Similar issues may arise with other types of tools.

There are also environmental factors. Anytime one hears of oil spills gigantic tankers spilling crude oil often come to mind. Aside from this, oil is also spilled on land that more often than not will reach our freshwater and marine environments. This harms all types of wildlife and plants, thousands of microscopic organisms, it damages food chains, which includes human food resources as well and so much more.

There are many shops that utilize oil and other chemicals that often experience spills that seep into topsoils or reach storm drains, and in turn finds its way into our oceans, rivers, and streams. In fact, the second most cited violation for OSHA is Hazard Communication ([1910.1200]:3199) according to Safety and Health (https://www.safetyandhealthmagazine.com Feb. 26, 2021). (The OSHA Hazard Communication section 1910.1200(a)(2), involves " . . . Classifying the potential hazards of chemicals and communicating information concerning hazards and appropriate protective measures to employees, development and implementation of employee training programs regarding hazards of chemicals and protective measures.")

The fact that this is the second most violated issue in the Trade industry calls for some apprehension. It is reason for concern all the more so considering that there are also DIY individuals who are committing similar infractions, in addition to thousands of deliberate acts of wrongful disposal of oils and chemicals.

There are several types of equipment required to enact the techniques of recovery following an oil spill. These are reactive techniques for oil spill control efforts. It would be preferable to have a tool that supports a proactive professional conduct to maintain mitigation of oil spill control efforts.

Professions that require constant usage of funnels lack convenient portable locations for safe keeping of funnels in use. When a funnel is not in use, the most concerning issue that arises is that it is more than capable of draining oil or chemicals onto the ground when there is not a convenient location to store it.

For this reason, the benefits of attaining a secure and conveniently located storage device to not only confine the funnel, but to optionally ensure capture of any residual oil or chemical fluids that would normally drain from the bottom of the funnel shaft outlet, is advantageous.

BRIEF SUMMARY OF THE INVENTION

At the outset, it is noted that the various features cited as follows in particular embodiments may be used together, either in part or in various combinations of features, within the scope of the invention. The following are examples within the scope of the invention, but other combinations of features are possible.

In one embodiment, a magnetic holder for a funnel has a cylindrical shaft having a first opening at one end and a second opening on the opposite end, the cylindrical shaft having an interior that can hold at least 1 cup of liquid when the second opening is closed. The first opening has a first diameter and the second opening has a second diameter, the first diameter being larger than the second diameter.

A first leg extends from a side of the shaft. A second leg is spaced longitudinally toward the second opening from the first leg, the second leg extending from the side of the shaft. The first leg is longer than the second leg. A magnet is secured to an end of the first leg away from the shaft, the magnet having a strength of at least 50 pounds. Another magnet is secured to an end of the second leg away from the shaft, the magnet having a strength of at least 50 pounds. A removable cap covers the second opening. The cylindrical shaft has an interior wall, with ribs extending longitudinally along the interior wall and extending inwardly into the shaft, wherein the ribs extend linearly along a longitudinal axis of the shaft and taper toward the second opening.

In this specific embodiment, the first leg is longer than the second leg and causes the shaft to extend at an angle when the first and second magnets are secured to a planar surface.

In another embodiment, a magnetic holder for a funnel has a cylindrical shaft having a first opening at one end and a second opening on the opposite end. The first opening has a first diameter and the second opening having a second diameter, the first diameter being larger than the second diameter. A first leg extends from a side of the shaft. A second leg spaced longitudinally toward the second opening from the first leg, extends from the side of the shaft. The first leg is longer than the second leg. A magnet is secured to an end of the first leg away from the shaft. A magnet is secured to an end of the second leg away from the shaft. A removable cap covers the second opening. The cylindrical shaft has an interior wall, with ribs extending longitudinally along the interior wall and extending inwardly into the shaft.

In this specific embodiment, the first leg is longer than the second leg causes the shaft to extend at an angle when the first and second magnets are secured to a planar surface.

Various features may be added, either alone or in combination with other features. The ribs may extend linearly along a longitudinal axis of the shaft. Alternatively, at least some of the ribs may be curved. The ribs may taper along the length of the holder. The cylindrical shaft may have an interior that can hold at least 1 cup of liquid when the second opening is closed. The holder, excluding the magnets, may be a molded polymer.

In yet another embodiment, a magnetic holder for a funnel may have a cylindrical shaft having a first opening at one end and a second opening on the opposite end. The first opening may have a first diameter and the second opening have a second diameter. A first magnetic leg may extend from a side of the shaft. A second magnetic leg may be spaced longitudinally toward the second opening from the first leg, the second leg extending from the side of the shaft. The first leg may be longer than the second leg. An end of the first leg away from the shaft may have a magnet strength of at least 50 pounds, and an end of the second leg away from the shaft may also have a magnet strength of at least 50 pounds. A removable cap covers the second opening. The cylindrical shaft has an interior wall, with ribs extending longitudinally along the interior wall and extending inwardly into the shaft.

In this embodiment, the first leg is longer than the second leg and causes the shaft to extend at an angle when the first and second magnets are secured to a planar surface.

The ribs may extend linearly along a longitudinal axis of the shaft and/or be curved. The ribs may taper along the length of the holder. The holder, when mounted on a planar mounting surface, may have an angle between 4 and 10 degrees.

The foregoing and other objects, features, and advantages of the invention will become more apparent from the following detailed description, which proceeds with reference to the accompanying figures.

BRIEF DESCRIPTION OF THE DRAWINGS

FIG. 3 shows the funnel of FIG. 2 inserted into the funnel holder of FIG. 1;

FIG. 4 illustrates aspects of the funnel holder of FIG. 1;

FIG. 5 is an exploded view showing components of the funnel holder of FIG. 1;

FIG. 6 is a cross-sectional view showing one configuration of an interior of the funnel holder according to FIG. 1;

FIG. 7 is a top view of the funnel holder; and

FIG. 8 is a side view of the funnel holder mounted onto a mounting surface, with a funnel held in the funnel holder.

DETAILED DESCRIPTION OF A PREFERRED EMBODIMENT

Figure 2:
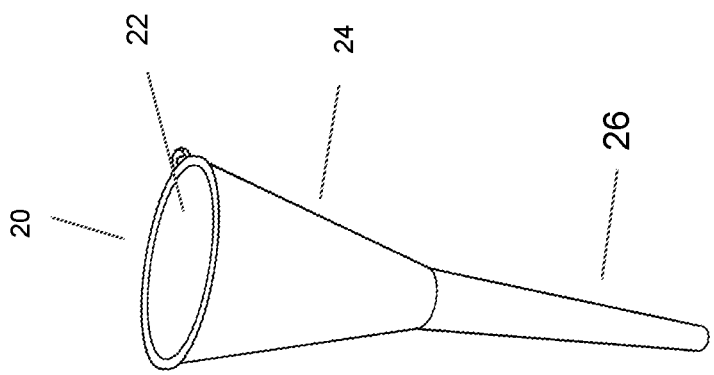
FIG. 2 shows an exemplary funnel that may be inserted into the top opening of the funnel holder according to FIG. 1.

For purposes of this description, certain aspects, advantages, and novel features of the embodiments of this disclosure are described herein. Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any particular embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

By way of overview, a magnetic funnel holder according to the present invention may accommodate a variety of styles and sizes of funnels and tools. In one embodiment, the funnel holder is designed to hold vehicle specific funnels. Features described in the following may be used alone or in combination with other features listed.

In one embodiment, the magnetic funnel holder is constructed of polypropylene for durability. Two powerful rare earth magnets are secured to respective legs to create stability when mounted on metal surfaces. In one embodiment, the magnets are neodymium (NdFeB). In one embodiment, the magnets have a pull force of 65 pounds each. The magnets may chosen to hold funnels or tools weighing up to 130 pounds, for instance.

To provide cleanliness, embodiments of the magnetic funnel holder may optionally feature a reservoir to collect fluids when the funnel is placed in the holder.

When mounted on a metal surface, the length of the legs may be designed to angle the holder with a slant away from the mounted surface to prevent the opening portion of the funnel from contacting the metal mounting surface.

In some embodiments, pass-through tool storage is also possible with a removable plug at the base of the holder. When the plug is in place, the interior of the funnel holder may act as a reservoir. To empty the reservoir, the plug is removed such that the fluid may drain out of the reservoir. In other embodiments, the plug is not removed but instead the device is magnetically disengaged from the mounting surface, and is turned upside down to drain the fluid from the device.

In one embodiment, the reservoir can hold at least 12 ounces of fluid.

The funnel holder may include ribs on an inner surface of the holder. The ribs may extend longitudinally along an axis of the holder. The ribs extend inwardly into the center of the holder. The ribs may optionally taper as they extend down the holder. In one specific embodiment, the ribs are spaced 1.45 inches apart, although the spacing may be adjusted as desired. The ribs may serve to strengthen the wall of the holder, and/or help keep the funnel from dropping too far into the holder.

The funnel holder may be made of a molded polymer, such that it is portable and lightweight.

Specifications of a specific, non-limiting embodiment are as follows:

| Magnetic Funnel Holder Specifications | |
| --- | --- |
| Length | 13.25" |
| Mouth Width | 2.35" |
| Base | 1.6" |
| Space Between Magnets | 4.9" |
| Size Of Magnets | 1.4" |
| Degrees Of Offset | 4° |
| Interior Ribs | 12 |
| Distance Between Ribs | 1.45" |
| Weight | 7.8 ounces |
| Top Distance From Mounting Surface | 1.5" |
| Type of Magnet | Neodymium Magnets (NdFeB) 65 Pound Strength 130 Pound Total Line Strength |
| MFH Material | Polypropylene |
| MFH Reservoir Size | 12 ounces |

Figure 1:
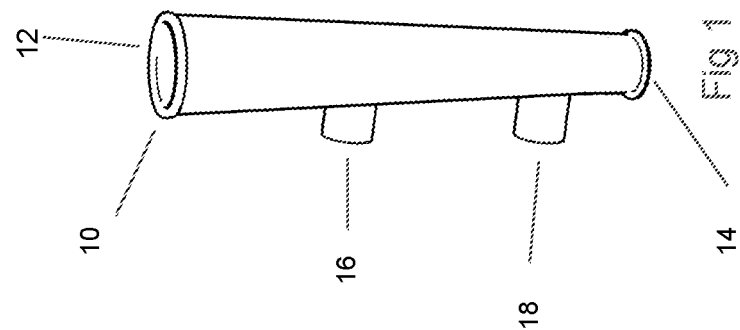
FIG. 1 shows a side view of a magnetic funnel holder according to the present invention.

Turning now to the Figures, and considering one non-limiting example, in one embodiment, a function of a Magnetic Funnel Holder (MFH) is to provide a place to store a variety of funnels. FIG. 1 shows a side view of a magnetic funnel holder according to the present invention. The interior of the MFH provides a reservoir to allow residual fluid that is in the funnel to be stored in the MFH reservoir without draining out the end.

FIG. 1 illustrates a funnel holder 10 that includes an opening 12. The MFH also includes mounting arms 16 and 18, as well as bottom end 14. FIG. 2 illustrates one example of a funnel 20. The funnel includes a wide opening 22 a taper portion 24 and an elongated neck 26. Typically a funnel such as in FIG. 2, for example, will fit into the opening 12 of the funnel holder 10.

FIG. 3 illustrates the funnel 20 inserted into the funnel holder 10. It should be understood that the funnel 20 is one example only. Other configurations of a funnel may be used. In alternative embodiments, the funnel holder 10 may hold other types of objects. For example, the holder 10 may hold tools for automotive repairs, plumbers, car wash shops, machine shops, sheet metal shops, woodworking shops that use funnels, and various other tools. Examples of other tools that may be used include paint brushes, utility brushes, spray bottles, grease guns, screwdrivers, kitchen utensils, barbecue utensils, pressure washer spray guns, clothes, brooms, flag poles, woodworking clamps, and various other tools.

FIG. 4 illustrates one particular embodiment of the funnel holder. The dimensions given are for example only. The diameter of the opening 12 in this specific embodiment is 2⅜ inches. The length of the holder 10 is 13¼ inches. The diameter of the lower end 14 is 1½ inches. The arms 16 and 18 maybe one and ¼ inch and one inch, respectively. Various other dimensions of this specific embodiment are illustrated on FIG. 4. However, it is understood that these dimensions are for only one specific embodiment of a funnel holder. The dimensions may be varied by the designer as suits specific uses.

FIG. 5 is an exploded view of different removable components of the funnel holder 10. In particular for the arms 16 and 18, each has a respective opening 38, 40. Magnets 30, 32 are secured within the respective openings. The securing means maybe screws 34, 36. Other mounting means for mounting the magnets 30, 32 may be utilized. In one embodiment, the magnets are powerful 65 pound, one and ¼ inch neodymium pull force magnets. Such powerful magnets create stability when mounted on a metal surface.

The magnetic funnel holder body may be constructed from various materials. For example any of a polyester, High, Density Polythene, PVC, low density polythene, polypropylene, polystyrene, acetal, ABS, polycarbonate, polylactide.

FIG. 6 illustrates one embodiment in which the interior of the funnel holder 10 includes spaced ribs 60. These ribs 60 extend inwardly from the interior walls of funnel holder 10. The ribs give the funnel holder wall durability and stiffness. The ribs also reduce the inner diameter of the funnel holder 10 to stop the funnel from dropping too far down the shaft. The ribs also allow a stop for a no spill or vehicle-specific funnel.

In one embodiment, the ribs 60 taper toward the narrow end of the holder. The width, size, and spacing of the ribs may be adjusted to accommodate specific sizes of funnels and/or tools. For example, funnels may be designed to be vehicle-specific. Thus, the ribs may be adjusted to accommodate the size and shape of the vehicle-specific funnel.

FIG. 7 is a top view looking down into one embodiment at the final 10. FIG. 7 illustrates the ribs 60 as seen from above, as well as the bottom end and cap 14, 42.

FIG. 8 illustrates the funnel holder 10 magnetically mounted to a mounting surface 74 typically the mounting surface is metallic such that the mounting magnets adhere thereto. In FIG. 8, mounting arms 16, 18 can be seen extending from the funnel holder 10. Typically the arm 16 may be longer than the arm 18, such that the funnel holder is at a slight angle. In FIG. 8 the angle is 4 degrees, which helps funnels not touch the mounting surface 74 when the funnel is inserted into the funnel holder 10. However, various other angles or no angle may be used.

Considering advantages of particular embodiments, in one embodiment of the invention, the benefits of attaining a secure and conveniently located storage device to not only confine the funnel, but to ensure capture of any residual oil or chemical fluids draining from the bottom of the funnel shaft outlet, is advantageous. Some reasons may include:

1. A tradesperson or DIY individual will be able to work more efficiently with multiple funnels due to the fact that they can place several Magnetic Funnel Holders in convenient locations at or near their work station.

2. Oil or chemical spills will be significantly reduced when there is a conveniently placed Magnetic Funnel Holder to ensure the containment of drainage.

3. In accordance with the formerly listed reasons, it is therefore accurate to determine that the use of a Magnetic Funnel Holder can be directly linked to supporting either the reuse of oils and chemicals and/or proper disposal of oils and chemicals in the effort to mitigate oil spill control efforts and aids to maintain compliance with suggestive environmental protection matters in regards to chemical compounds that pose threat to aquatic and human life listed by the United States Environmental Protection Agency and OSHA.

The Magnetic Funnel Holder works to assist in resolving, as much as possible, the complications listed above in regard to tradespersons working with oils and chemicals everyday. It solves funnel storage dilemmas by ensuring one can attain a portable and reliable location to store their funnels while simultaneously capturing residual drainage in order to reuse or to properly dispose of. Apart from this, the Magnetic Funnel Holder improves the tradesperson or DIY individual's ability to uphold EPA and OSHA requirements in his/her workplace/space.

In a prior art device that is simply a funnel rack, it does not collect residual oil or chemicals from the funnels placed in the rack. This presents opportunities for leaks and/or spills.

Other prior art necessitates replacement parts, which creates opportunities for a faulty or leaky unit. Again this presents opportunities for leaks and/or spills. In conjunction with possible spills, this contributes to an increase in the surplus of trash created by the parts that necessitate constant replacement.

In addition, some prior art must be attached to a mounting surface by screws. This indicates that they are permanent fixtures and cannot be moved easily or quickly. This can be inconvenient when working directly with funnels for long durations of time throughout the workday.

In one embodiment of the present invention, a Magnetic Funnel Holder will capture residual fluids by guiding it through the funnel shaft and into the reservoir. Furthermore, in one specific embodiment, it has been designed with a wide mouth and interior ribs sectioned at 1.45" apart to not only provide extra durability and stability, but to also support a wide selection of contrasting funnels as well.

In some embodiments, a Magnetic Funnel Holder does not have any moving parts or pieces that have to be replaced. The durability of the design and construction eliminates chances of product failure, it secures a long-term investment strategy by ensuring a secure sturdiness and strength for the long life of the product and it is completely portable. The portability of the Magnetic Funnel Holder is of a valuable significance as it demonstrates that despite one's location, there is always a way to safeguard the local environment and terrain from oil or chemical spills.

With the Magnetic Funnel Holder there is a proper place to store and drain funnels. Hence, all fluids captured in the reservoir of the Magnetic Funnel Holder can be saved, reused or easily drained into a proper receptacle for disposal or recycling in an effort to mitigate oil spill control efforts, as well as to be in compliance with suggestive environmental protection matters listed by the EPA and OSHA.

In view of the many possible embodiments to which the principles of the disclosed technology may be applied, it should be recognized that the illustrated embodiments are only preferred examples of the disclosure and should not be taken as limiting the scope of the disclosure. Rather, the scope of the disclosure is defined by the following claims. I therefore claim as my disclosure all that comes within the scope and spirit of these claims.

What is claimed is:

1. A magnetic holder for a funnel, comprising:
a tubular shaft having a first opening at one end and a second opening on the opposite end, the tubular shaft having an interior that can hold at least 1 cup of liquid when the second opening is closed;
the first opening having a first diameter and the second opening having a second diameter, the first diameter being larger than the second diameter;
a first leg extending from a side of the shaft;
a second leg spaced longitudinally toward the second opening from the first leg, the second leg extending from the side of the shaft;
the first leg being longer than the second leg;
a magnet secured to an end of the first leg away from the shaft, the magnet having a strength of at least 50 pounds;
a magnet secured to an end of the second leg away from the shaft, the magnet having a strength of at least 50 pounds;
a removable cap covering the second opening; and
the tubular shaft having an interior wall, with ribs extending longitudinally along the interior wall and extending inwardly into the shaft, wherein the ribs extend linearly along a longitudinal axis of the shaft and taper toward the second opening;
wherein the first leg being longer than the second leg causes the shaft to extend at an angle when the first and second magnets are secured to a planar surface.

2. A magnetic holder for a funnel, comprising:
a generally tubular shaft having a first opening at one end and a second opening on the opposite end;
the first opening having a first diameter and the second opening having a second diameter, the first diameter being larger than the second diameter;
a first leg extending from a side of the shaft;
a second leg spaced longitudinally toward the second opening from the first leg, the second leg extending from the side of the shaft;
the first leg being longer than the second leg;
a magnet secured to an end of the first leg away from the shaft;
a magnet secured to an end of the second leg away from the shaft;
a cap covering the second opening; and
the tubular shaft having an interior wall, with ribs extending longitudinally along the interior wall and extending inwardly into the shaft;
wherein the first leg being longer than the second leg causes the shaft to extend at an angle when the first and second magnets are secured to a planar surface.

3. The magnetic holder for a funnel of claim 2 wherein the ribs extend linearly along a longitudinal axis of the shaft.

4. The magnetic holder for a funnel of claim 2 wherein at least some of the ribs are curved.

5. The magnetic holder for a funnel of claim 2 wherein the ribs taper along the length of the holder.

6. The magnetic holder for a funnel of claim 2 wherein the cylindrical tubular
shaft has an interior that can hold at least 1 cup of liquid when the second opening is closed.

7. The magnetic holder for a funnel of claim 2 wherein the holder, excluding the magnets, is a molded polymer.

8. A magnetic holder for a funnel, comprising:
a generally tubular shaft having funnel insertion opening at one end and a closed opposite end, the shaft having an interior space to hold liquid
a first magnetic leg extending from a side of the shaft;
at least a second magnetic leg spaced longitudinally toward the closed end from the first leg, the second leg extending from the side of the shaft;
the first leg being longer than the second leg; and
the generally cylindrical shaft having an interior wall, with ribs extending longitudinally along the interior wall and extending inwardly into the shaft;
wherein the first leg being longer than the second leg causes the shaft to extend at an angle when the magnetic legs are secured to a planar surface.

9. The magnetic holder for a funnel of claim 8 wherein the ribs extend linearly along a longitudinal axis of the shaft.

10. The magnetic holder for a funnel of claim 8 wherein at least some of the ribs are curved.

11. The magnetic holder for a funnel of claim 8 wherein the ribs taper along the length of the holder.

12. The magnetic holder for a funnel of claim 8 wherein the interior space can hold at least 1 cup of liquid.

13. The magnetic holder for a funnel of claim 8 wherein the holder, excluding magnets in the magnetic legs is a molded polymer.

14. The magnetic holder for a funnel of claim 8 wherein the angle is between 4 and 10 degrees.

15. The magnetic holder for a funnel of claim 8, wherein the funnel insertion opening has a first width, and the closed opposite end has a second width, the first width being wider than the second width, wherein the holder, excluding the magnets, is a molded polymer.

16. The magnetic holder for a funnel of claim 8, wherein at least one of the first and second legs has a magnetic strength of at least 50 pounds.

17. The magnetic holder for a funnel of claim 8 wherein the ribs extend linearly along a longitudinal axis of the shaft;
   wherein the funnel insertion opening has a first width, and the closed opposite end has a second width, the first width being wider than the second width;
   wherein the holder, excluding the magnets, is a molded polymer;
   wherein the interior space can hold at least 1 cup of liquid;
   wherein at least the first or second magnetic leg has a strength of at least 40 pounds; and
   wherein the angle is between 4 and 10 degrees.

* * * * *